C. SMALLEY.
TRUSS FOR AUTOMOBILES.
APPLICATION FILED OCT. 18, 1921.
1,424,685. Patented Aug. 1, 1922.
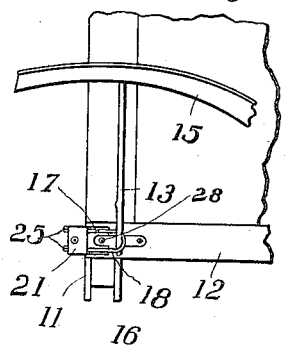
Fig. 1.
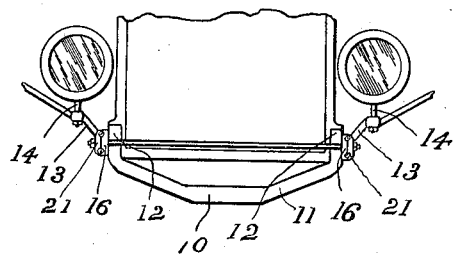
Fig. 2.
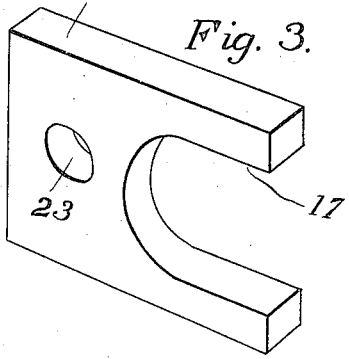
Fig. 3.
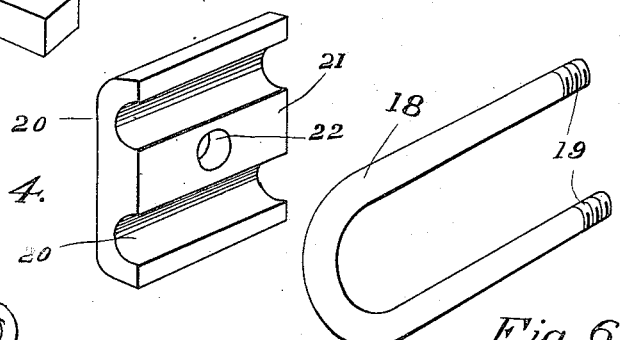
Fig. 4. Fig. 6.
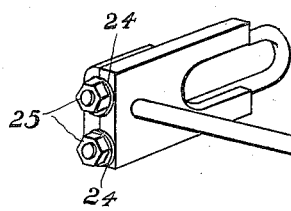
Fig. 5.
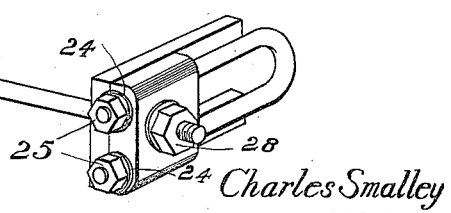
Charles Smalley
INVENTOR
BY *Victor J. Evans*
ATTORNEY
WITNESS:

UNITED STATES PATENT OFFICE.

CHARLES SMALLEY, OF WAGNER, SOUTH DAKOTA.

TRUSS FOR AUTOMOBILES.

1,424,685.  Specification of Letters Patent.  Patented Aug. 1, 1922.

Application filed October 18, 1921. Serial No. 508,527.

*To all whom it may concern:*

Be it known that I, CHARLES SMALLEY, a citizen of the United States, residing at Wagner, in the county of Charles Mix and State of South Dakota, have invented new and useful Improvements in Trusses for Automobiles, of which the following is a specification.

The present invention relates to improvements in trusses for automobiles.

An object of the invention is to provide a simple and efficient truss which may be readily applied to the frame of a Ford automobile to brace the front cross member of the frame.

With the above and other objects in view, the invention consists in certain novel features of construction, combination and arrangement of parts, as will be more fully described and particularly pointed out in the appended claims.

In the accompanying drawings—

Figure 1 is a side elevation of the invention applied to the frame of a Ford automobile.

Figure 2 is a front elevation of the invention applied to the frame of an automobile.

Figure 3 is a detail perspective view of the bearing plate.

Figure 4 is a detail perspective view of the retaining plate.

Figure 5 is a perspective view of the parts in assembled position.

Figure 6 is a detail perspective view of the U-shaped member.

Referring now to the drawings, in which like characters of reference designate corresponding parts throughout the several views, the numeral 10 designates the frame of a Ford automobile having a curved cross member 11 connecting the forward ends of a pair of parallel side members 12. A pair of inclined fender irons 13 are secured to the side members 12 adjacent to the curved cross member 11 and support a pair of lamp brackets 14 and the front fenders 15.

The invention comprises a pair of rectangular bearing plates 16 which are adapted to engage the side members 12 of the frame and are provided at one edge with substantially semi-circular recesses 17 which are adapted to receive the fender irons 13.

A pair of substantially U-shaped members 18 provided with threaded extensions 19 are adapted to surround the fender irons 13 extending from the side members 12 of the frame and are received in transverse grooves 20 formed in a pair of elongated retaining plates 21 which are adapted to engage the opposite sides of the bearing plates 16.

The elongated retaining plates 21 are provided with central openings 22 which are in alignment with circular openings 23 formed in the bearing plates 16 when one edge of the elongated plates coincides with one edge of the bearing plates so as to form flat bases for washers 24 surrounding the threaded extremities 19 of the U-shaped member. Nuts 25 are mounted upon the threaded extremities of the U-shaped member and engage the washers 24.

A relatively long rod 26 extends through the openings 22 and 23 formed in the plates and is provided with threaded extremities receiving washers 27 which engage one side of the retaining plates. Nuts 28 are mounted on the threaded extremities of the rod and engage the washers 27.

In use, the bearing plates are mounted on the rod and the recesses engage the fender irons. The U-shaped member is then secured in position around the fender irons by mounting the retaining plates on the rod and adjusting the nuts 25. The nuts 28 are adjusted and the front cross member 11 is then effectively braced.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. The combination with an automobile frame and a pair of fender irons extending therefrom, of a pair of bearing plates adapted to engage said frame, a pair of U-shaped members adapted to surround said fender irons, means for retaining said U-shaped members in position, a rod extending through said plates and means carried by said rod for retaining said plates in position.

2. The combination with an automobile frame and a pair of fender irons extending therefrom, of a pair of bearing plates adapted to engage the side members of said frame, a pair of U-shaped members adapted to surround said fender irons and provided with threaded extremities, a pair of retaining plates engaging said U-shaped members and said bearing plates, means carried by said threaded extremities and engaging one edge of said plates for securing said U-shaped members in position, a rod extending through said plates and means carried by said rod and engaging said retaining plates for securing said bearing plates in position.

3. The combination with an automobile frame and a pair of fender irons extending therefrom, of a pair of bearing plates adapted to engage said frame and provided with recesses adapted to engage said fender irons, a pair of U-shaped members adapted to surround said fender irons and provided with threaded extremities, elongated retaining plates engaging said bearing plates and provided with transverse grooves receiving said U-shaped members, means carried by said threaded extremities and engaging one edge of said plates for securing said U-shaped members in position, a rod extending through said plates and means carried by said rod and engaging said retaining plates for securing said bearing plates in position.

In testimony whereof I affix my signature.

CHARLES SMALLEY.